US012767580B2

(12) United States Patent
Takano et al.

(10) Patent No.: US 12,767,580 B2
(45) Date of Patent: Oct. 20, 2026

(54) OPTICAL FIBER PREFORM AND METHOD OF MEASURING AND MEASUREMENT DEVICE FOR REFRACTIVE INDEX CHANGE POSITION OF OPTICAL FIBER

(71) Applicant: SUMITOMO ELECTRIC INDUSTRIES, LTD., Osaka (JP)

(72) Inventors: Junya Takano, Osaka (JP); Sotaro Ida, Osaka (JP); Tetsuya Hayashi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 14 days.

(21) Appl. No.: 18/855,123

(22) PCT Filed: Apr. 12, 2023

(86) PCT No.: PCT/JP2023/014897
§ 371 (c)(1),
(2) Date: Oct. 8, 2024

(87) PCT Pub. No.: WO2023/204121
PCT Pub. Date: Oct. 26, 2023

(65) Prior Publication Data
US 2025/0251303 A1 Aug. 7, 2025

(51) Int. Cl.
*G02B 6/44* (2006.01)
*C03B 37/025* (2006.01)
(Continued)

(52) U.S. Cl.
CPC ........ *C03B 37/0253* (2013.01); *C03B 37/029* (2013.01); *C03C 25/106* (2013.01);
(Continued)

(58) Field of Classification Search
CPC . C03B 37/0253; C03B 37/029; C03C 25/106; G01M 11/33; G02B 6/448
See application file for complete search history.

(56) References Cited

U.S. PATENT DOCUMENTS 4,882,497 A 11/1989 Inoue et al.
5,298,047 A 3/1994 Hart, Jr. et al.
(Continued)

FOREIGN PATENT DOCUMENTS

CN 1931757 A 3/2007
CN 102889862 A 1/2013
(Continued)

OTHER PUBLICATIONS

Translation of JP 2001004486 A (Year: 2001).*
(Continued)

*Primary Examiner* — Kara E. Geisel
(74) *Attorney, Agent, or Firm* — McDonald Hopkins LLC

(57) ABSTRACT

The method for measuring the refractive index variation position of an optical fiber preform comprises: rotating the optical fiber preform about the central axis such that a straight line which is orthogonal to the central axis and which passes through two more refractive index variation positions of choice that are subject to measurement is orthogonal to the observation axis; irradiating a side surface of the optical fiber preform with light emitted from the light source, via the polarizer; receiving, with the camera and via the analyzer, the light that has been transmitted by the optical fiber preform, and acquiring a light intensity image; detecting a refractive index variation position of the optical fiber preform on the basis of the light intensity image; and moving the optical fiber preform or the observation axis parallel to the central axis.

13 Claims, 8 Drawing Sheets

(51) Int. Cl.
*C03B 37/029* (2006.01)
*C03C 25/106* (2018.01)
*G01M 11/00* (2006.01)

(52) U.S. Cl.
CPC ............ *G01M 11/33* (2013.01); *G02B 6/448* (2013.01); *C03B 2205/06* (2013.01)

(56) References Cited

U.S. PATENT DOCUMENTS

| | | | |
|---|---|---|---|
| 5,408,309 | A | 4/1995 | Shimada et al. |
| 2002/0066292 | A1 | 6/2002 | Wang |
| 2002/0126944 | A1 | 9/2002 | Kim et al. |
| 2016/0229733 | A1 | 8/2016 | Nakanishi et al. |
| 2017/0285258 | A1 | 10/2017 | Kokura |
| 2020/0064549 | A1 | 2/2020 | Nishina |
| 2024/0254032 | A1 | 8/2024 | Takano et al. |

FOREIGN PATENT DOCUMENTS

| | | | | | |
|---|---|---|---|---|---|
| CN | 210089976 | U | | 2/2020 | |
| CN | 115917278 | A | * | 4/2023 | ............ G01M 11/00 |
| JP | S64-014126 | A | | 1/1989 | |
| JP | H02-196204 | A | | 8/1990 | |
| JP | H06-123672 | A | | 5/1994 | |
| JP | H08-277139 | A | | 10/1996 | |
| JP | H10-020142 | A | | 1/1998 | |
| JP | 2000-213912 | A | | 8/2000 | |
| JP | 2001-004486 | A | | 1/2001 | |
| JP | 2001-097732 | A | | 4/2001 | |
| JP | 2002-286583 | A | | 10/2002 | |
| JP | 2009-007201 | A | | 1/2009 | |
| JP | 2014-159348 | A | | 9/2014 | |
| JP | 2020-020998 | A | | 2/2020 | |
| JP | 2021-156761 | A | | 10/2021 | |
| WO | 2016/047669 | A1 | | 3/2016 | |
| WO | 2020/162410 | A1 | | 8/2020 | |

OTHER PUBLICATIONS

Translation of JP 2002-82018 (Year: 2002).*
Andrew D. Yablon, "Multi-Wavelength Optical Fiber Refractive Index Profiling by Spatially Resolved Fourier Transform Spectroscopy," Journal of Lightwave Technology, vol. 28, No. 4, pp. 360-364, Feb. 15, 2010.
Takuji Nagashima et al., "Multi-Core Fibre with Concaved Double-D Shape Cross Section", Proc. European Conference on Optical Communication (ECOC), p.M.2.B.5(2017).
US Office Action issued in U.S. Appl. No. 18/564,647 dated Feb. 3, 2026.
US Notice of Allowance issued in U.S. Appl. No. 18/564,647 dated Jun. 16, 2026.

* cited by examiner

OPTICAL FIBER PREFORM AND METHOD OF MEASURING AND MEASUREMENT DEVICE FOR REFRACTIVE INDEX CHANGE POSITION OF OPTICAL FIBER

TECHNICAL FIELD

The present disclosure relates to an optical fiber preform and a method of measuring and measurement device for a refractive index change position of an optical fiber. The present application claims priority based on the international application PCT/JP2022/018193 filed on Apr. 19, 2022, and the entire contents described in the international application are incorporated herein by reference.

BACKGROUND ART

In recent years, data traffic tends to further increase with the development of technologies such as the Internet of Things (IoT) and Metaverse. This trend is expected to continue in the future. In order to increase the capacity of optical communication networks, research is being actively conducted on not only conventional general-purpose single-mode optical fibers (SMF) but also various optical fibers. Examples of such optical fibers include a small-diameter SMF, a multimode optical fiber (MMF), and a multi-core optical fiber (MCF). According to the small-diameter SMF, the number of optical fibers per optical cable can be increase. According to the MMF and the MCF, the spatial multiplexing density of signals per optical fiber can be improved. In order to realize an optical communication system using such an optical fiber, it is necessary to establish not only a method of designing the optical fiber itself but also a technique of manufacturing an optical fiber preform and a connection technique such as a fusion splicer and an optical connector. In order to establish these techniques, a technique capable of nondestructively measuring the refractive index change position inside the optical fiber preform or the optical fiber is required.

Patent literature 1 describes the necessity of controlling the core pitch or the like in the rod-in-collapse step. Patent literature 2 describes a method of measuring the eccentricity of the core portion of an optical fiber preform using a polarization filter. The reflected light component on the outer surface of the optical fiber preform is removed by the polarization filter, and the boundary line caused by the difference in glass composition between a core portion and a cladding portion can be clearly distinguished.

Patent literature 3 describes a method of measuring the refractive index distribution of an optical fiber by generating a phase image based on two intensity images obtained by side observation of the optical fiber from different imaging directions and performing Abel inverse transformation of the phase image. Non-patent literature 1 describes a method of nondestructively measuring the refractive index distribution of an optical fiber by detecting light emitted from the side of the optical fiber with an imaging element using an optical system based on a Mach-Zehnder interference and performing fast Fourier transform on the interference fringe signal.

CITATION LIST

Patent Literature

Patent literature 1: Japanese Unexamined Patent Application Publication No. 2014-159348

Patent literature 2: Japanese Unexamined Patent Application Publication No. 2000-213912

Patent literature 3: Japanese Unexamined Patent Application Publication No. 2021-156761

Non Patent Literature

Non-patent literature 1: A. D. Yablon, "Multi-Wavelength Optical Fiber Refractive Index Profiling by Spatially Resolved Fourier Transform Spectroscopy," Journal of Lightwave Technology, vol. 28, no. 4, pp. 360-364, Feb. 15, 2010

SUMMARY OF INVENTION

A method of measuring a refractive index change position of an optical fiber preform using a measurement device according to an aspect of the present disclosure including a holder configured to hold the optical fiber preform rotatably about a central axis, a light source and a camera disposed on an observation axis orthogonal to the central axis with the optical fiber preform interposed therebetween, a polarizer disposed between the light source and the optical fiber preform, and a analyzer having a transmission axis orthogonal to a transmission axis of the polarizer and disposed between the optical fiber preform and the camera, the method includes: rotating the optical fiber preform about the central axis so that a straight line being orthogonal to the central axis and passing through desirable two or more points of refractive index change positions to be measured is orthogonal to the observation axis; irradiating a side surface of the optical fiber preform with light emitted from the light source, through the polarizer; receiving light transmitted through the optical fiber preform by the camera through the analyzer and acquiring a light intensity image; detecting the two or more points of the refractive index change positions based on the light intensity image; and moving the optical fiber preform or the observation axis in parallel to the central axis.

DETAILED DESCRIPTION

Figure 1:
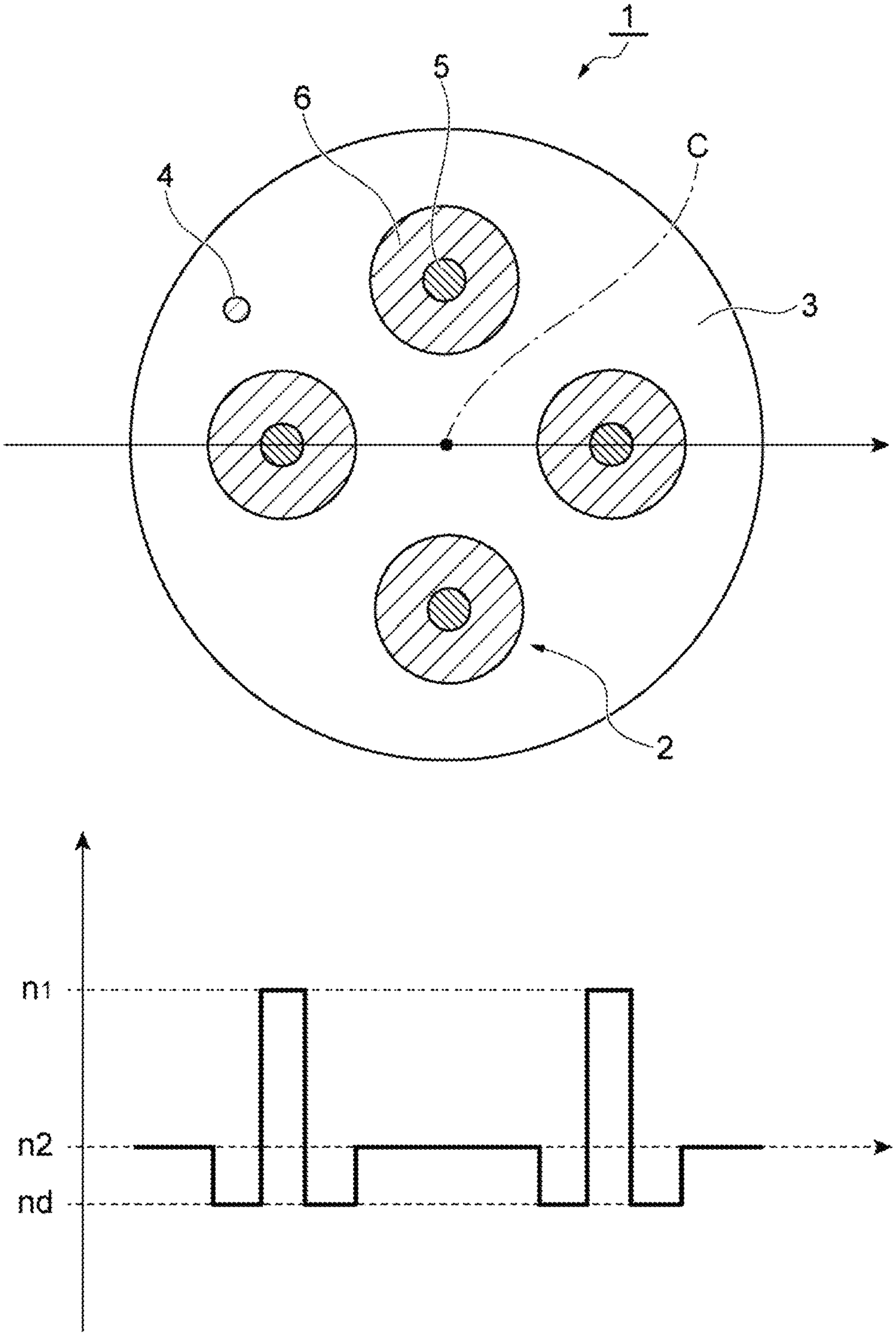
FIG. 1 is a diagram showing a cross section of an optical fiber preform and a refractive index distribution in the direction of an arrow in the cross section.

Problems to be Solved by Present Disclosure

In the method of measuring the refractive index distribution of an optical fiber preform using a preform analyzer, a laser beam is scanned from the side of the optical fiber preform point by point along a straight line (scan axis) that is orthogonal to the central axis of the optical fiber preform and orthogonal to the direction of emission of the laser beam. Thus, when the diameter of the optical fiber preform is increased, the number of scan points is increased, and thus the measurement time is increased. In the method described in Patent Literature 2, when the difference in refractive index between different materials is minute, it is difficult to detect the boundary line on the intensity image with high accuracy, and there is a concern that a measurement error may increase. In the method described in Patent literature 3 and the method described in Non-patent literature 1, the time required for numerical calculation is long, and thus the measurement time increases.

The present disclosure is directed to providing an optical fiber preform and a method of measuring and measuring device for a refractive index change position of an optical fiber, which can improve measurement accuracy while suppressing measurement time.

Advantageous Effects of Present Disclosure

According to the present disclosure, it is possible to provide an optical fiber preform and a method of measuring and measurement device for a refractive index change position of an optical fiber, which can improve measurement accuracy while suppressing a measurement time.

DESCRIPTION OF EMBODIMENTS OF PRESENT DISCLOSURE

First, embodiments of the present disclosure will be listed and described.

(1) A method of measuring a refractive index change position of an optical fiber preform using a measurement device according to an aspect of the present disclosure including a holder configured to hold the optical fiber preform rotatably about a central axis, a light source and a camera disposed on an observation axis orthogonal to the central axis with the optical fiber preform interposed therebetween, a polarizer disposed between the light source and the optical fiber preform, and a analyzer having a transmission axis orthogonal to a transmission axis of the polarizer and disposed between the optical fiber preform and the camera, the method includes: rotating the optical fiber preform about the central axis so that a straight line being orthogonal to the central axis and passing through desirable two or more points of refractive index change positions to be measured is orthogonal to the observation axis; irradiating a side surface of the optical fiber preform with light emitted from the light source, through the polarizer; receiving light transmitted through the optical fiber preform by the camera through the analyzer and acquiring a light intensity image; detecting the two or more points of the refractive index change positions based on the light intensity image; and moving the optical fiber preform or the observation axis in parallel to the central axis. In this method of measuring, a measurement device including a polarizer and a analyzer having transmission axes orthogonal to each other is used. When the polarized wave after passing through the polarizer passes through the distortion existing at the boundary position between the different materials, that is, the refractive index change position, the polarization state changes due to the photoelastic effect. Thus, the light transmitted through the distortion can be transmitted through the analyzer. Thus, the difference in brightness due to the presence or absence of distortion generates in the light intensity image acquired by the camera. According to this method of measuring, it is possible to improve measurement accuracy while suppressing the measurement time.

(2) The method of measuring the refractive index change position of the optical fiber preform of the above (1), the method may further include immersing at least a portion in a central axis direction of the optical fiber preform in a medium having a refractive index larger than a refractive index of air and equal to or smaller than a refractive index of glass. The side surface of the optical fiber preform may be irradiated with the light emitted from the light source, through the polarizer and the medium. The light transmitted through the optical fiber preform may be received by the camera through the medium and the analyzer and the light intensity image may be acquired. In this case, the influence of the lens effect derived from the shape of the side surface of the optical fiber preform is suppressed.

(3) In the above (1) or (2), the optical fiber preform may be a polarization-maintaining fiber preform. In this case, not only the eccentricity and the size of the core portion but also those of a stress applying portion can be measured.

(4) In the above (1) or (2), the optical fiber preform may be a multi-core optical fiber preform. In this case, the eccentricity and the size of the core portion can be measured.

(5) In any one of the above (1) to (4), the optical fiber preform may include a cladding portion, and a pair of core portions disposed with the central axis interposed therebetween and having a maximum center-to-center distance. The two or more points of the refractive index change positions are positions on two boundaries close to an outer peripheral surface of the cladding portion among boundaries between the cladding portion and the pair of core portions existing on the straight line. The center-to-center distance of the pair of core portions may be measured from a distance between the two boundaries detected in the detecting. In this case, the refractive index change position can be measured without being affected by other core portions.

(6) The method of measuring the refractive index change position of the optical fiber preform of any one of the above (1) to (5), the method may further include correcting image distortion caused by a lens effect of the side surface of the optical fiber preform for the light intensity image by an equation below, $$x = \underline{d}a/\left[\sqrt{(n2/n0)^2 - (a/r)^2}\sqrt{1-(a/r)^2} + (a/r)^2\right] \quad \text{[Math 1]}$$

where da may be an apparent distance of the refractive index change position from the central axis, x may be a true distance of the refractive index change position from the central axis, no may be a refractive index of an area around a cladding portion, n2 may be a refractive index of the cladding portion, and r may be a radius of the cladding portion. In this case, image distortion caused by the lens effect of the side surface of the optical fiber preform can be easily corrected.

(7) A device of measuring a refractive index change position of an optical fiber preform according to an aspect of the present disclosure, the device includes a holder configured to hold the optical fiber preform rotatably about a central axis, a light source and a camera disposed on an observation axis orthogonal to the central axis with the optical fiber preform interposed therebetween, a polarizer disposed between the light source and the optical fiber preform, and a analyzer having a transmission axis orthogonal to a transmission axis of the polarizer and disposed between the optical fiber preform and the camera. The holder holds the optical fiber preform so that a straight line being orthogonal to the central axis and passing through desirable two or more points of refractive index change positions to be measured is orthogonal to the observation axis. The light source irradiates a side surface of the optical fiber preform with light through the polarizer. The camera receives light transmitted through the optical fiber preform, through the analyzer, and acquires a light intensity image in which a difference in brightness is generated at the two or more points of the refractive index change positions. The holder holds the optical fiber preform movably in a direction parallel to the central axis, or the light source, the camera, the polarizer, and the analyzer are configured to be movable in the direction parallel to the central axis. In this measurement device, the polarizer and the analyzer having transmission axes orthogonal to each other are used. When the polarized wave after passing through the polarizer passes through the distortion existing at the boundary position between the different materials, that is, the refractive index change position, the polarization state changes due to the photoelastic effect. Thus, the light transmitted through the distortion can be transmitted through the analyzer. Thus, the difference in brightness due to the presence or absence of distortion generates in the light intensity image acquired by the camera. According to the measurement device, it is possible to improve measurement accuracy while suppressing the measurement time.

(8) In the above (7), a container may be configured to house at least a portion in a central axis direction of the optical fiber preform, the container being filled with a medium having a refractive index larger than a refractive index of air and equal to or smaller than a refractive index of glass. In this case, the influence of the lens effect derived from the shape of the side surface of the optical fiber preform is suppressed. Thus, the side surface of the optical fiber preform can be irradiated with the light emitted from the light source, through the polarizer and the medium. The light transmitted through the optical fiber preform can be received by the camera through the medium and the analyzer.

(9) A method of measuring a refractive index change position of an optical fiber using a measurement device according to an aspect of the present disclosure including a holder configured to hold the optical fiber rotatably about a central axis, a light source and a camera disposed on an observation axis orthogonal to the central axis with the optical fiber interposed therebetween, a polarizer disposed between the light source and the optical fiber, and a analyzer having a transmission axis orthogonal to a transmission axis of the polarizer and disposed between the optical fiber and the camera, the method includes: rotating the optical fiber about the central axis so that a straight line being orthogonal to the central axis and passing through desirable two or more points of refractive index change positions to be measured is orthogonal to the observation axis; irradiating a side surface of the optical fiber with light emitted from the light source, through the polarizer; receiving light transmitted through the optical fiber by the camera through the analyzer and acquiring a light intensity image; and detecting the two or more points of the refractive index change positions based on the light intensity image. In this method of measuring, a measurement device including the polarizer and the analyzer having transmission axes orthogonal to each other is used. When the polarized wave after passing through the polarizer passes through the distortion existing at the boundary position between the different materials, that is, the refractive index change position, the polarization state changes due to the photoelastic effect. Thus, the light transmitted through the distortion can be transmitted through the analyzer. Thus, the difference in brightness due to the presence or absence of distortion generates in the light intensity image acquired by the camera. According to this method of measuring, it is possible to improve measurement accuracy while suppressing the measurement time.

(10) The method of measuring the refractive index change position of the optical fiber of the above (9), the method may further include moving the optical fiber or the observation axis in parallel to the central axis. In this case, the internal structure of the optical fiber can be easily measured at an arbitrary position in the longitudinal direction.

(11) The method of measuring the refractive index change position of the optical fiber of the above (9) or (10), the method may further include immersing at least a portion in a central axis direction of the optical fiber in a medium having a refractive index larger than a refractive index of air and equal to or smaller than a refractive index of glass. The side surface of the optical fiber may be irradiated with the light emitted from the light source, through the polarizer and the medium. The light transmitted through the optical fiber is received by the camera through the medium and the analyzer and the light intensity image is acquired. In this case, the influence of the lens effect derived from the shape of the side surface of the optical fiber is suppressed.

(12) In any one of the above (9) to (11), the optical fiber may be a polarization-maintaining fiber. In this case, not only the eccentricity and the size of the core but also those of the stress applying portion can be measured.

(13) In any one of the above (9) to (11), the optical fiber may be a multi-core optical fiber. In this case, the eccentricity and size of the core can be measured.

(14) In the above (13), the optical fiber may include a cladding, and a pair of cores disposed with the central axis interposed therebetween and having a maximum center-to-center distance. The two or more points of the refractive index change positions may be positions on two boundaries close to an outer peripheral surface of the cladding among boundaries between the cladding and the pair of cores existing on the straight line. The center-to-center distance of the pair of cores may be measured from a distance between the two boundaries detected in the detecting. In this case, the refractive index change position can be measured without being affected by other core.

(15) The method of measuring the refractive index change position of the optical fiber of any one of (9) to (14), the method may further includes: correcting image distortion caused by a lens effect of the side surface of the optical fiber for the light intensity image by an equation below, $$x = da/\left[\sqrt{(n2/n0)^2 - (a/r)^2}\sqrt{1-(a/r)^2} + (a/r)^2\right] \quad \text{[Math 2]}$$

where da may be an apparent distance of the refractive index change position from the central axis, x may be a true distance of the refractive index change position from the central axis, no may be a refractive index of an area around a cladding, n2 may be a refractive index of the cladding, and r may be a radius of the cladding. In this case, image distortion caused by the lens effect of the side surface of the optical fiber can be easily corrected.

(16) A device of measuring a refractive index change position of an optical fiber according to an aspect of the present disclosure, the device includes a holder configured to hold the optical fiber rotatably about a central axis, a light source and a camera disposed on an observation axis orthogonal to the central axis with the optical fiber interposed therebetween, a polarizer disposed between the light source and the optical fiber, and a analyzer having a transmission axis orthogonal to a transmission axis of the polarizer and disposed between the optical fiber and the camera. The holder holds the optical fiber so that a straight line being orthogonal to the central axis and passing through desirable two or more points of refractive index change positions to be measured is orthogonal to the observation axis. The light source irradiates a side surface of the optical fiber with light through the polarizer. The camera receives light transmitted through the optical fiber through the analyzer and acquires a light intensity image in which a difference in brightness is generated at the two or more points of the refractive index change positions. In this measurement device, the polarizer and the analyzer having transmission axes orthogonal to each other are used. When the polarized wave after passing through the polarizer passes through the distortion existing at the boundary position between the different materials, that is, the refractive index change position, the polarization state changes due to the photoelastic effect. Thus, the light transmitted through the distortion can be transmitted through the analyzer. Thus, the difference in brightness due to the presence or absence of distortion generates in the light intensity image acquired by the camera. According to the measurement device, it is possible to improve measurement accuracy while suppressing the measurement time.

(17) In the above (16), the holder may hold the optical fiber movably in a direction parallel to the central axis, or the light source, the camera, the polarizer, and the analyzer may be configured to be movable in the direction parallel to the central axis. In this case, the internal structure of the optical fiber can be easily measured at an arbitrary position in the longitudinal direction.

Details of Embodiments of Present Disclosure

Specific examples of the optical fiber preform and the method of measuring and measuring device of the refractive index change position of the optical fiber of the present disclosure will be described below with reference to the drawings. The present invention is not limited to these examples, but is defined by the scope of the claims, and is intended to include all modifications within the meaning and scope equivalent to the scope of the claims. In the description of the drawings, the same elements are denoted by the same reference numerals, and redundant description will be omitted.

(Optical Fiber Preform and Optical Fiber)

First, an optical fiber preform and an optical fiber to be measured by the method of measuring a refractive index change position and the measurement device according to the embodiment will be described. FIG. 1 is a diagram showing a cross section of an optical fiber preform and a refractive index distribution in the direction of an arrow in the cross section. As shown in FIG. 1, an optical fiber preform 1 includes a plurality of core portions 2, a cladding portion 3 commonly provided, and a marker portion 4. Optical fiber preform 1 of the embodiment is a multi-core optical fiber (MCF) preform. Optical fiber preform 1 may be a single mode fiber (SMF) preform, a multimode fiber (MMF) preform, a polarization-maintaining fiber (PMF) preform, or the like.

The plurality of core portions 2 extend along a central axis C of optical fiber preform 1. The plurality of core portions 2 are disposed at positions that are rotationally symmetric with respect to the center of optical fiber preform 1 in the cross section orthogonal to central axis C. The cross-sectional shapes of the plurality of core portions 2 are the same circular shape. Here, the number of core portions 2 is four, and optical fiber preform 1 is, for example, a square 4-core MCF fiber, but is not limited thereto.

Core portion 2 includes a central core portion 5 and a depressed portion 6. Depressed portion 6 surrounds central core portion 5 and is provided in contact with the outer peripheral surface of central core portion 5. Depressed portion 6 is an individual cladding portion or an optical cladding portion. Cladding portion 3 surrounds the plurality of core portions 2 and marker portion 4. Cladding portion 3 is provided in contact with the outer peripheral surface of each of the plurality of core portions 2 and marker portion 4. Core portion 2 may not include depressed portion 6.

A refractive index n1 of central core portion 5 is higher than a refractive index n2 of cladding portion 3. A refractive index nd of depressed portion 6 is lower than refractive index n2 of cladding portion 3. Central core portion 5 is a high refractive index region having refractive index n1 higher than refractive index n2 of cladding portion 3. Each of central core portion 5, depressed portion 6, and cladding portion 3 is made of silica-based glass. Each of central core portion 5, depressed portion 6, and cladding portion 3 contains silica glass as a main component and a dopant for adjusting the refractive index. Germanium is well known as an additive element for increasing the refractive index. Fluorine and boron are well known as additive elements for decreasing the refractive index.

Marker portion 4 is provided to identify each core portion 2. Marker portion 4 is provided at a position away from central axis C of optical fiber preform 1. Marker portion 4 is provided at a position away from each core portion 2. The diameter of marker portion 4 is, for example, smaller than the diameter of core portion 2 and is 2 μm to 10 μm. Marker portion 4 is distinguished from core portion 2 by, for example, being colored. Marker portion 4 has a refractive index different from refractive index n2 of cladding portion 3, for example. Marker portion 4 is made of silica-based glass. Marker portion 4 contains silica glass as a main component and a dopant for coloring or adjusting the refractive index, for example.

Although not shown, the optical fiber obtained from optical fiber preform 1 has a configuration corresponding to optical fiber preform 1. The cross-sectional structure of the optical fiber is similar to the cross-sectional structure of optical fiber preform 1. The optical fiber has the same refractive index distribution as that of optical fiber preform 1. The optical fiber includes a plurality of cores each including the plurality of core portions 2, a common cladding including cladding portion 3, and a marker including marker portion 4. The core includes a depressed portion including depressed portion 6, and a central core including central core portion 5. The core may not include the depressed portion. The depressed portion is an individual cladding or an optical cladding. The diameter of central core portion 5 is, for example, 6 μm to 12 μm. The diameter (cladding diameter) of cladding portion 3 is, for example, 124 μm to 126 μm. The optical fiber is not limited to the MCF, and may be an SMF, an MMF, a PMF, or the like.

(Method of Manufacturing Optical Fiber Preform and Optical Fiber)

Figure 2:
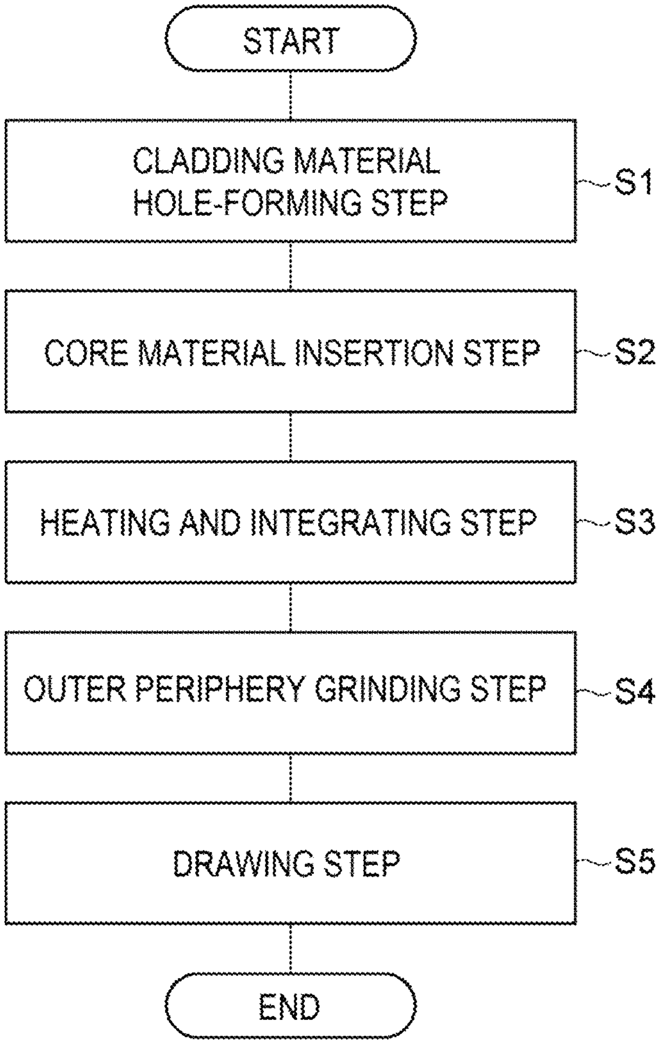
FIG. 2 is a flowchart showing a method of manufacturing an optical fiber.

Next, the method of manufacturing optical fiber preform 1 and an optical fiber will be described. One of the methods of manufacturing the MCF preform is a hole-forming method. Here, a case where optical fiber preform 1 is manufactured by the hole-forming method will be described. FIG. 2 is a flowchart showing a method of manufacturing an optical fiber. As shown in FIG. 2, the method of manufacturing an optical fiber includes a cladding material hole-forming step S1, a core material insertion step S2, a heating and integrating step S3, an outer periphery grinding step S4, and a drawing step S5. The optical fiber is manufactured by, for example, performing the cladding material hole-forming step S1, the core material insertion step S2, the heating and integrating step S3, the outer periphery grinding step S4, and the drawing step S5 in this order. Optical fiber preform 1 is manufactured by performing the cladding material hole-forming step S1, the core material insertion step S2, the heating and integrating step S3, and the outer periphery grinding step S4 in this order.

The cladding material hole-forming step S1 is a step of forming a plurality of holes penetrating in the longitudinal direction through a cylindrical glass material (cladding material) to be cladding portion 3 of optical fiber preform 1. The core material insertion step S2 is a step of inserting a core material to be core portion 2 of optical fiber preform 1 into each hole of the cladding material. The core material includes a region having a higher refractive index than the refractive index of the cladding material, that is, a region serving as central core portion 5. In this case, the marker material to be marker portion 4 is also inserted into the hole portion of the cladding material. The heating and integrating step S3 is a step of heating and integrating the cladding material, the core material, and the marker material. In the heating and integrating step S3, the cladding material, the core material, and the marker material are heated in an axisymmetric manner while being rotated about the central axis of the cladding material. Thus, the cladding material, the core material and the marker material are integrated, and optical fiber preform 1 is manufactured. The outer periphery grinding step S4 is a step of grinding the outer periphery of cladding portion 3. The drawing step S5 is a step of drawing optical fiber preform 1. Thus, an optical fiber is manufactured.

As described in Patent Literature 1, in the heating and integrating step S3, the cladding material is heated in an axisymmetric manner while being rotated about the central axis, and thus, in the core material located in the non-central region of the cladding material, the deformation of the glass in the vicinity of the core material is not symmetric. Thus, the center of the hole portion and the center of the core material after integration do not coincide with each other. Thus, it is difficult to accurately dispose core portion 2 at a designed position. The cross-sectional structure of the optical fiber obtained by drawing is similar to the cross-sectional structure of optical fiber preform 1. Thus, the mismatch between the center position of the core material after the heating and integration and the designed position causes the connection loss of the optical fiber. In order to suppress the connection loss, it is necessary to appropriately adjust the center position of core portion 2 with respect to the center position of cladding portion 3. Thus, a method of measuring the eccentricity of core portion 2 is required.

The above-described problem of core portion eccentricity during the manufacture of an optical fiber preform may occur in manufacturing methods other than the hole-forming method. Examples of the manufacturing method other than the hole-forming method include a modified chemical vapor deposition (MCVD) method, an outside vapor deposition (OVD) method, and a vapor phase axial deposition (VAD) method. The problem of core portion eccentricity may occur not only in the manufacture of MCF preforms, but also in the manufacture of optical fiber preforms such as SMF preforms, MMF preforms, and PMF preforms. The ratio of the core diameter to the cladding diameter of the optical fiber is an important parameter that affects the mode field diameter, the effective core area, the splice loss, and the nonlinear optical effect, and thus, it is necessary to appropriately maintain the ratio from the stage of the optical fiber preform. Since the circularity of the core greatly affects the polarization mode dispersion, it is desirable to keep the non-circularity of the core uniform in the longitudinal direction. In the case of the PMF, it is desirable to be able to measure not only the eccentricity and the size of the core portion but also those of the stress applying portion. For example, in the stress applying portion to which boron is added, the refractive index is lower than the refractive index of the cladding portion.

Thus, it is desirable to be able to measure the internal structure of an optical fiber preform at arbitrary intervals in the longitudinal direction. Thus, a method of nondestructively measuring the refractive index change position, which is a boundary between the different materials in the optical fiber preform, from the side of the optical fiber preform is required. Based on the measurement result, it is possible to discriminate a defective product before drawing and adjust the amount of grinding of the outer periphery of the cladding portion.

A method of nondestructively measuring the refractive index change position of an optical fiber from the side of the optical fiber is also required. For example, when optical fibers such as MCF and PMF are connected to each other by a fusion splicer, it is necessary to perform rotational alignment of the optical fibers. There is an end face alignment method in which a mirror element having a reflecting surface of 45° is installed between a pair of optical fibers disposed to face each other, and rotational alignment is performed while observing end face images of the pair of optical fibers. In this method, the optical system inside the fusion splicer becomes complicated, and the fusion splicer may be increased in size. On the other hand, in the side alignment method in which the rotational alignment is performed based on the intensity distribution image obtained by the side observation of the optical fiber, the mirror element is not necessary, and thus it is possible to suppress an increase in size of the fusion splicer. The side alignment method is also applicable to applications other than the fusion splicer, such as in the manufacture of optical fiber connectors and optical fiber arrays. By measuring the refractive index change position inside the optical fiber with high accuracy from the side observation, it is possible to perform the rotational alignment with higher accuracy.

(Method of Measuring and Measurement Device of Refractive Index Change Position)

A method of measuring and a measurement device of a refractive index change position according to the embodiment will be described. The method of measuring and measurement device of the refractive index change position according to the embodiment is used between the heating and integrating step S3 and the outer periphery grinding step S4, for example, with optical fiber preform 1 as the observation target. Thus, the eccentricity of core portion 2 of optical fiber preform 1 can be measured. Based on the measurement result, the outer periphery of cladding portion 3 is ground in the outer periphery grinding step S4, whereby the center position of core portion 2 can be adjusted. The observation target may be an optical fiber on which rotational alignment is performed. In this case, rotational alignment of the optical fiber can be performed with high accuracy. The following description will be made on the case where the observation target is optical fiber preform 1.

Figure 3:
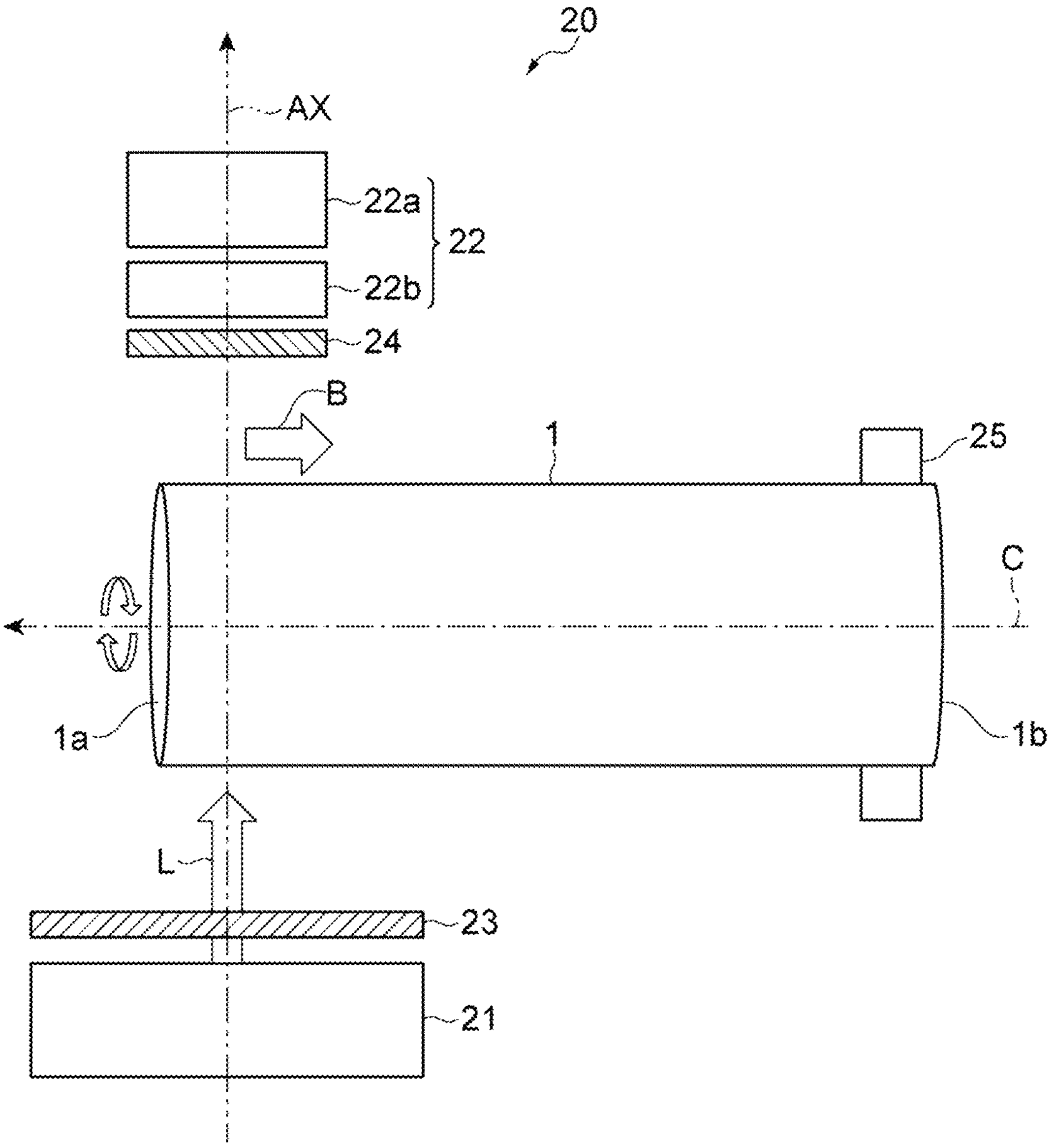
FIG. 3 is a configuration diagram of a measurement device of a refractive index change position according to an embodiment.

FIG. 3 is a configuration diagram of a measurement device of a refractive index change position according to an embodiment. As shown in FIG. 3, a measurement device 20 includes a light source 21, a camera 22, a polarizer 23, a analyzer 24, and a holder 25.

Light source 21 irradiates optical fiber preform 1 with a light L. Light L may be collimated light or non-collimated light. In the case of collimated light, the effective diameter of the lens needs to be equal to or larger than the outer diameter of optical fiber preform 1. In the case of non-collimated light, a lens 22*b* can be miniaturized. Camera 22 acquires a side observation image of optical fiber preform 1. Camera 22 includes an imaging element 22*a* and lens 22*b*. Lens 22*b* may be a telecentric lens or a non-telecentric lens of a variable magnification type. In the case of a telecentric lens, the effective diameter of the lens needs to be equal to or larger than the outer diameter of optical fiber preform 1. Thus, as the diameter of optical fiber preform 1 increases, the size and the introduction cost of measurement device 20 increase. In the case of the non-telecentric lens of the variable magnification type, the camera field of view can be enlarged and reduced simply by adjusting the lens magnification and the camera position. Thus, even when the diameter of optical fiber preform 1 is increased, the measurement can be performed with a device configuration which is inexpensive and compact as compared with a telecentric lens.

Light source 21 and camera 22 are disposed on an observation axis AX orthogonal to central axis C of optical fiber preform 1 with optical fiber preform 1 interposed therebetween. Observation axis AX is on a straight line orthogonal to central axis C, that is, observation axis AX is on a straight line perpendicular to central axis C and passing through central axis C. Lens 22*b* is disposed between light source 21 and imaging element 22*a*. Light source 21 and camera 22 are disposed such that observation axis AX connecting light source 21 and camera 22 is orthogonal to central axis C of optical fiber preform 1.

Polarizer 23 is disposed between light source 21 and optical fiber preform 1 on observation axis AX. Polarizer 23 transmits only light vibrating in the transmission axis direction of polarizer 23 among light L. Analyzer 24 is disposed between optical fiber preform 1 and camera 22 on observation axis AX. Analyzer 24 transmits only light vibrating in the transmission axis direction of analyzer 24 among the light transmitted through optical fiber preform 1. Polarizer 23 and analyzer 24 have transmission axes orthogonal to each other.

Holder 25 holds optical fiber preform 1 rotatably about central axis C. Holder 25 is, for example, a glass lathe. Optical fiber preform 1 may be rotated manually or automatically by a rotary encoder or the like.

Measurement device 20 is configured such that at least one of optical fiber preform 1 and observation axis AX is movable in parallel to central axis C. Thus, the side observation of optical fiber preform 1 can be performed at an arbitrary position in the longitudinal direction of optical fiber preform 1. In the embodiment, light source 21, camera 22, polarizer 23, and analyzer 24 are configured to be movable in a direction B parallel to central axis C. Thus, observation axis AX can be moved in parallel to a direction from a one end 1*a* of optical fiber preform 1 toward an another end 1*b* along central axis C. Instead of observation axis AX or in addition to observation axis AX, holder 25 may hold optical fiber preform 1 movably in direction B parallel to central axis C.

The measurement principle of measurement device 20 will be described. In optical fiber preform 1, materials having different refractive indices, such as core portion 2 and cladding portion 3, have different compositions. At the boundary position between such different materials, distortion occurs after the heating and integration. The optical fiber obtained from optical fiber preform 1 also has distortion. When the polarized wave after passing through polarizer 23 passes through the boundary position between the different materials in which distortion exists, the polarization state changes due to the photoelastic effect. Thus, the light transmitted through the distortion can be transmitted through analyzer 24 whose transmission axis is orthogonal to the transmission axis of polarizer 23, and is received by camera 22. On the other hand, the polarization state of the polarized wave that does not pass through the distortion does not change, and thus the polarized wave cannot pass through analyzer 24 and is not received by camera 22. Thus, a clear difference in brightness due to the presence or absence of distortion is generated in the light intensity image obtained by camera 22. Thus, according to measurement device 20, it is possible to detect the boundary position between the different materials, that is, the refractive index change position more clearly than focusing on a minute refractive index difference of the refractive index change position of the observation target.

Figure 4:
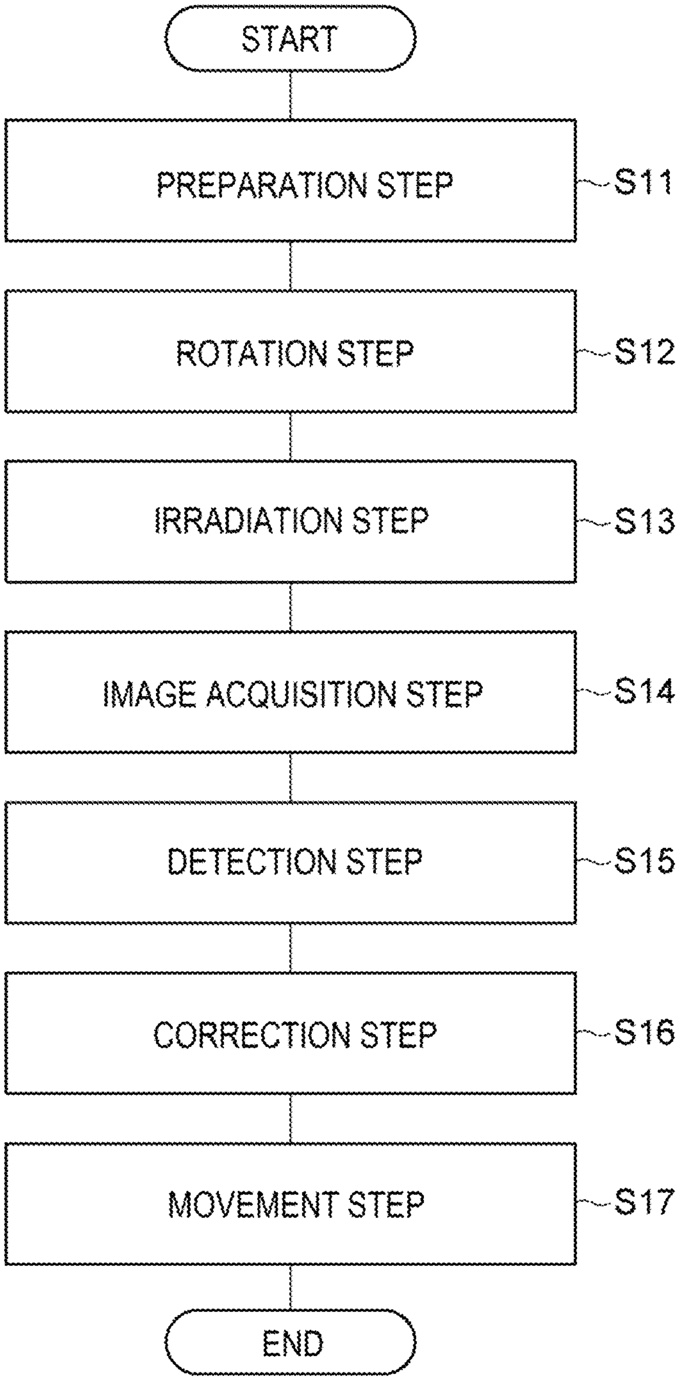
FIG. 4 is a flowchart showing a method of measuring a refractive index change position according to an embodiment.

FIG. 4 is a flowchart showing a method of measuring a refractive index change position according to an embodiment. The method of measuring the refractive index change position according to the embodiment is performed using measurement device 20. The method of measuring the refractive index change position includes a preparation step S11, a rotation step S12, an irradiation step S13, an image acquisition step S14, a detection step S15, a correction step S16, and a movement step S17.

The preparation step S11 includes a step of holding optical fiber preform 1 rotatably about central axis C by holder 25, and a step of disposing light source 21, camera 22, polarizer 23, and analyzer 24 at predetermined positions on observation axis AX. The rotation step S12 is a step of rotating optical fiber preform 1 held by holder 25 about central axis C so that a straight line m which is orthogonal to central axis C and passes through desirable two or more points of refractive index change positions to be measured is orthogonal to observation axis AX (see FIG. 5), that is, the straight line m is perpendicular to observation axis AX and passes through observation axis AX. By performing this rotational operation and then aligning the focal point of camera 22 with central axis C, the ratio between the outer diameter of optical fiber preform 1 and an outermost core pitch can be accurately measured. Here, the outermost core pitch is a center-to-center distance between a pair of core portions 2 disposed with central axis C interposed therebetween. A pair of core portions 2 defining the outermost core pitch is positioned on one straight line orthogonal to central axis C. When a plurality of pairs of core portions 2 are disposed on a straight line orthogonal to central axis C with central axis C interposed therebetween, the pair of core portions 2 having the maximum center-to-center distance is the pair of core portions 2 that define the outermost core pitch.

The outer diameter of optical fiber preform 1 is measured by, for example, a vernier caliper or a size measuring device. The outermost core pitch can also be easily obtained from the outer diameter of optical fiber preform 1 and the above ratio. Further, by focusing on the geometrical properties of the cross-sectional structure, an adjacent core pitch can also be obtained as $1/\sqrt{2}$ times the outermost core pitch. Here, the adjacent core pitch is a center-to-center distance between a pair of core portions 2 adjacent to each other about central axis C. When optical fiber preform 1 is a 2-core MCF preform in which two core portions 2 are disposed at positions symmetrical with respect to central axis C, the outermost core pitch is equal to the adjacent core pitch.

Figure 5:
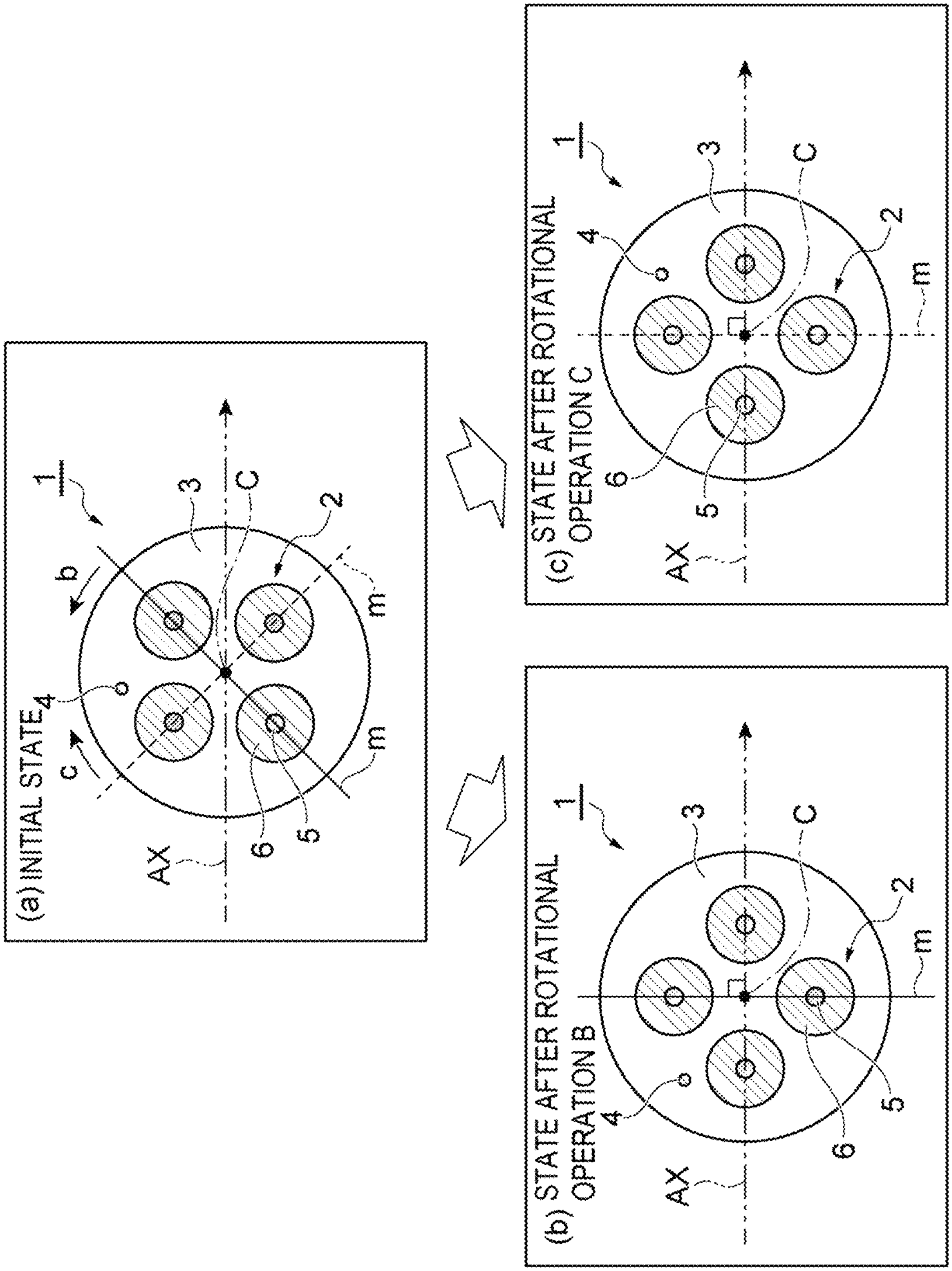
FIG. 5 is a cross-sectional view showing the relationship between the rotational operation of an optical fiber preform and the observation axis.

FIG. 5 is a cross-sectional view showing the relationship between the rotational operation of an optical fiber preform and the observation axis As shown in FIG. 5, when optical fiber preform 1 is a 4-core MCF preform, a plurality of orthogonal relationships satisfying the condition are generated as shown in FIGS. 5(*b*) and 5(*c*). This is because there are two straight lines m that are orthogonal to central axis C and pass through the central axes of the pair of core portions 2 disposed with central axis C interposed therebetween. In FIG. 5, one straight line m is shown by a solid line, and the other straight line m is shown by a dashed line. (a) In the initial state, none of the two straight lines m is orthogonal to observation axis AX. Optical fiber preform 1 may be rotated about central axis C so that the straight line m indicated by the solid line is orthogonal to observation axis AX (a rotational operation b), or optical fiber preform 1 may be rotated about central axis C so that the straight line m indicated by the dashed line is orthogonal to observation axis AX (a rotational operation c). (b) The outermost core pitch measured in the state after rotational operation b and (c) the outermost core pitch measured in the state after rotational operation c may be averaged, and the average value may be used as the outermost core pitch of optical fiber preform 1. By determining the amount of grinding of the outer periphery based on the average value, the plurality of adjacent core pitches can be made more uniform.

On each straight line m, there are four boundaries between a pair of core portion 2 and cladding portion 3. Among these, two boundaries close to central axis C overlap with other core portions 2, and may not be clearly detected on the light intensity image. In this case, the distance between two boundaries close to the outer peripheral surface of cladding portion 3 that can be clearly detected is measured. That is, the refractive index change positions of the desirable two or more points to be measured are the positions of two boundaries close to the outer peripheral surface of cladding portion 3, among the pair of boundaries between core portion 2 and cladding portion 3 existing on the straight line m. The outer diameter of core portion 2 is equal to the outer diameter of the core material. Thus, the outermost core pitch can be obtained by subtracting the outer diameter of the core material measured in advance from the distance between the two boundaries detected in the detection step S15.

The rotation step S12 is performed while visually observing the end face of optical fiber preform 1, for example. After the angle is roughly adjusted by visual observation, the outermost core pitch may be measured a plurality of times while changing the angle little by little by holder 25, and the longest measured value may be set as the outermost core pitch.

The irradiation step S13 is a step of irradiating the side surface of optical fiber preform 1 with light L emitted from light source 21, through polarizer 23. Only the light whose vibration direction coincides with the direction of the transmission axis of polarizer 23 among light L is transmitted through polarizer 23 and the side surface of optical fiber preform 1 is irradiated with the light. The image acquisition step S14 is a step of receiving light transmitted through optical fiber preform 1 by camera 22 through analyzer 24 and acquiring a light intensity image. Only the light whose vibration direction coincides with the direction of the transmission axis of analyzer 24 among the light transmitted through optical fiber preform 1 is transmitted through analyzer 24 and received by camera 22.

The detection step S15 is a step of detecting the desirable two or more points of the refractive index change positions to be measured based on the acquired light intensity image. The boundary positions between the pair of core portion 2 disposed with central axis C interposed therebetween and cladding portion 3 are detected by the difference in brightness of the light intensity image. Thus, the outermost core pitch and the adjacent core pitch can be obtained.

Figure 6:
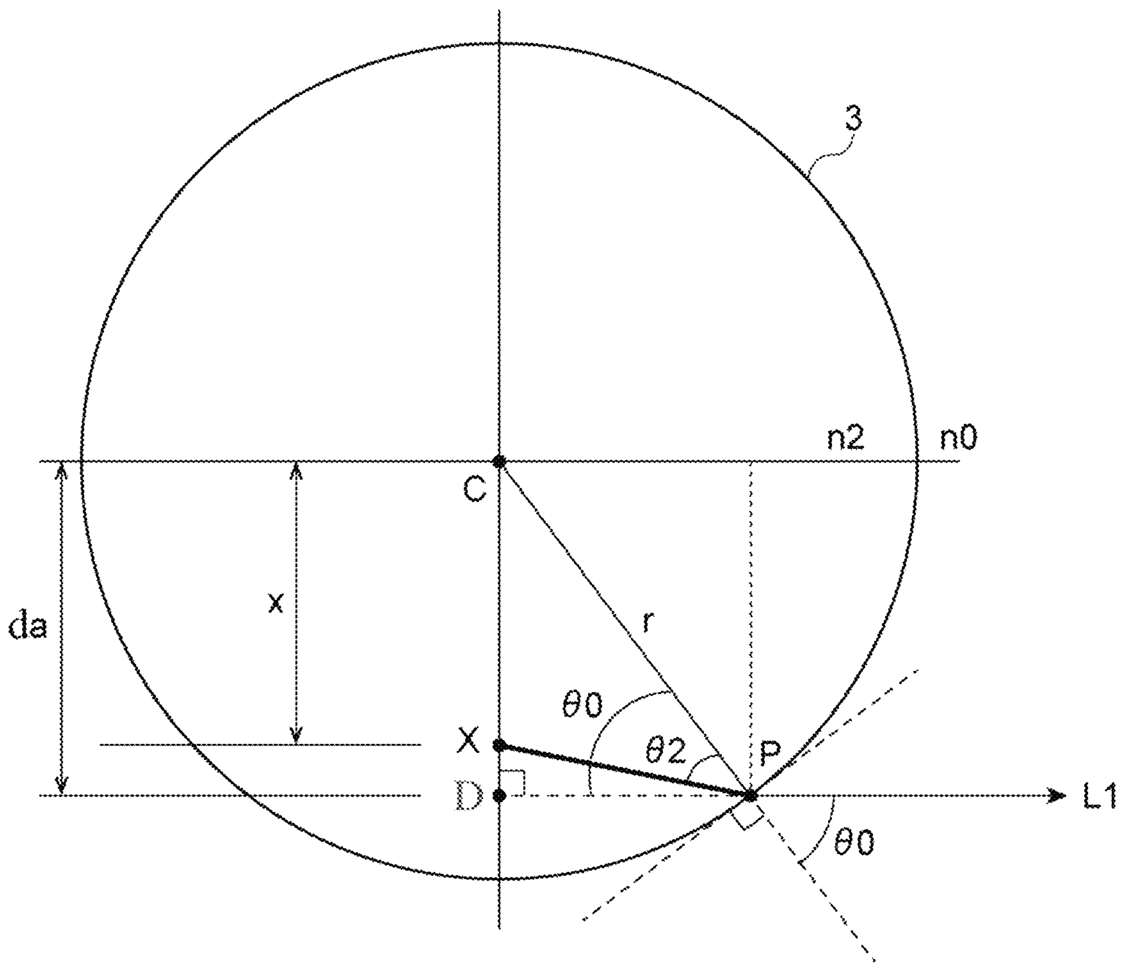
FIG. 6 is a schematic diagram for explaining correction of image distortion caused by a lens effect of a side surface of an optical fiber preform.

The correction step S16 is a step of correcting image distortion caused by the lens effect of the side surface of optical fiber preform 1. FIG. 6 is a schematic diagram for explaining correction of image distortion caused by the lens effect of a side surface of an optical fiber preform. The circumference shown in FIG. 6 represents the outer surface of cladding portion 3. The center point of the circle represents central axis C. The radius of the circle (i.e., the radius of cladding portion 3) is r. A refractive index around cladding portion 3 is n0, and the refractive index of cladding portion 3 is n2 ($n0 \leq n2$). For example, no is the refractive index of air. An incident angle and a refracting angle when the light ray is traced backward are θ0 and θ2, respectively. At this time, an angle formed between C, P and D is θ0, and an angle formed between C, P and X is θ2. When attention is paid to a light ray L1 parallel to the optical axis, light passing through a point P on the circumference is observed as if it corresponds to an apparent point D due to the lens effect, not a true passage point X, on the image. A true distance x is smaller than an apparent distance da ($x<da$).

An equation for correcting an apparent distance da and a true distance x due to the image distortion is derived. First, equation (1) is established from Snell's law.

[Math 3]

$$n0\sin\theta 0 = n2\sin\theta 2 \quad (1)$$

Here, equation (2) is derived from equation (1) and the ratio between a line segment CX and a line segment CD shown in FIG. 6.

[Math 4]

$$x = \underline{d}a/\left[\sqrt{(n2/n0)^2 - (a/r)^2}\sqrt{1-(a/r)^2} + (a/r)^2\right] \quad (2)$$

From equation (2), true distance x can be obtained by correcting apparent distance da due to image distortion.

The movement step S17 is a step of moving optical fiber preform 1 or observation axis AX in parallel to central axis C in a state where observation axis AX is orthogonal to central axis C. The rotation step S12, the irradiation step S13, the image acquisition step S14, the detection step S15, and the correction step S16 are repeatedly performed while moving optical fiber preform 1 or observation axis AX in the movement step S17, and the internal structure of optical fiber preform 1 is measured at arbitrary intervals in the longitudinal direction.

As described above, in the embodiment, polarizer 23 and analyzer 24 having transmission axes orthogonal to each other are used. When the polarized wave after passing through polarizer 23 passes through the distortion existing at the boundary position between the different materials, that is, the refractive index change position, the polarization state changes due to the photoelastic effect. Thus, the light transmitted through the distortion can be transmitted through analyzer 24. Thus, the difference in brightness due to the presence or absence of distortion generates in the light intensity image acquired by camera 22. According to the embodiment, it is possible to improve measurement accuracy while suppressing a measurement time.

In the method of measuring using the preform analyzer, the refractive index distribution is measured by scanning light from the side of the optical fiber preform along the scanning axis point by point and performing Abel inverse transformation on the measurement result of the polarization angle. Disadvantages of this method include an increase in the number of scan points of the laser beam and an increase in measurement time, an increase in introduction cost due to an increase in the size of the optical system, and a calculation time required for numerical calculation process, which are associated with an increase in the diameter of the base material. In addition, in the case of the measurement of only the refractive index change position, only the polarization angle is sufficient, and the refractive index distribution is not necessary, and thus the method of measuring using the preform analyzer is over-spec. Non-patent literature 1 and patent literature 3 disclose methods of measuring the refractive index distribution inside an optical fiber, but both methods require numerical calculation process, and the calculation time increases, resulting in an increase in the measurement time. Further, if the measurement is limited to the measurement of only the refractive index change position as in the preform analyzer, the measurement results in overspecification.

In contrast, in the method of measuring the refractive index change position using measurement device 20, it is not necessary to scan light from the side of optical fiber preform 1 along the scan axis point by point, and the measurement time is unlikely to increase even if the diameter of optical fiber preform 1 increases. Light L emitted by light source 21 may be non-collimated light, and thus the size of the optical system can be reduced, and an increase in the cost of introducing measurement device 20 can be suppressed. Further, since a complicated numerical calculation process is not required, the measurement time can be suppressed.

While the embodiments have been described, the present disclosure is not necessarily limited to the above-described embodiments and modifications, and various changes can be made without departing from the spirit and scope of the present disclosure.

Figure 7:
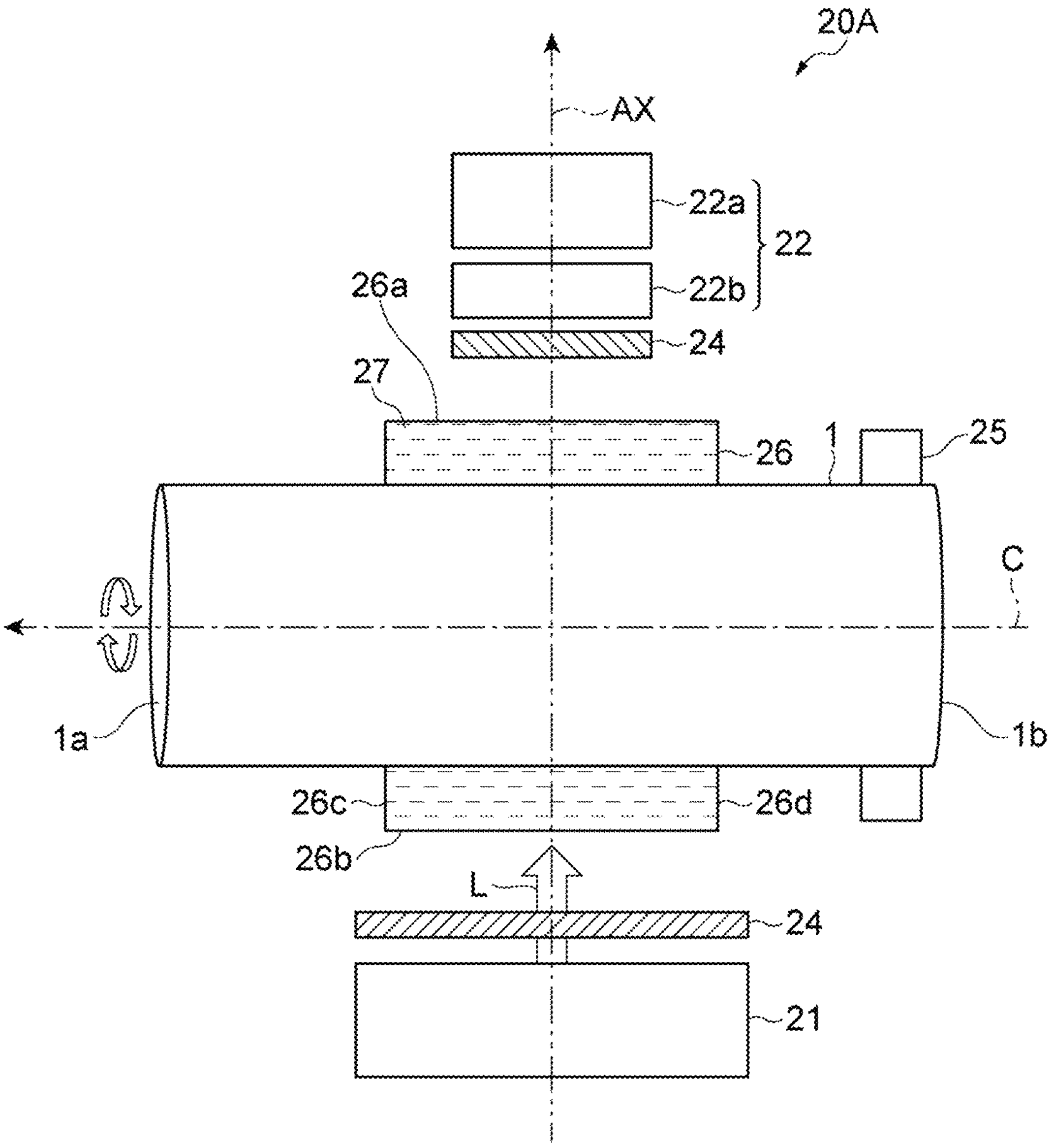
FIG. 7 is a configuration diagram of a measurement device for a refractive index change position according to modification.
Figure 8:
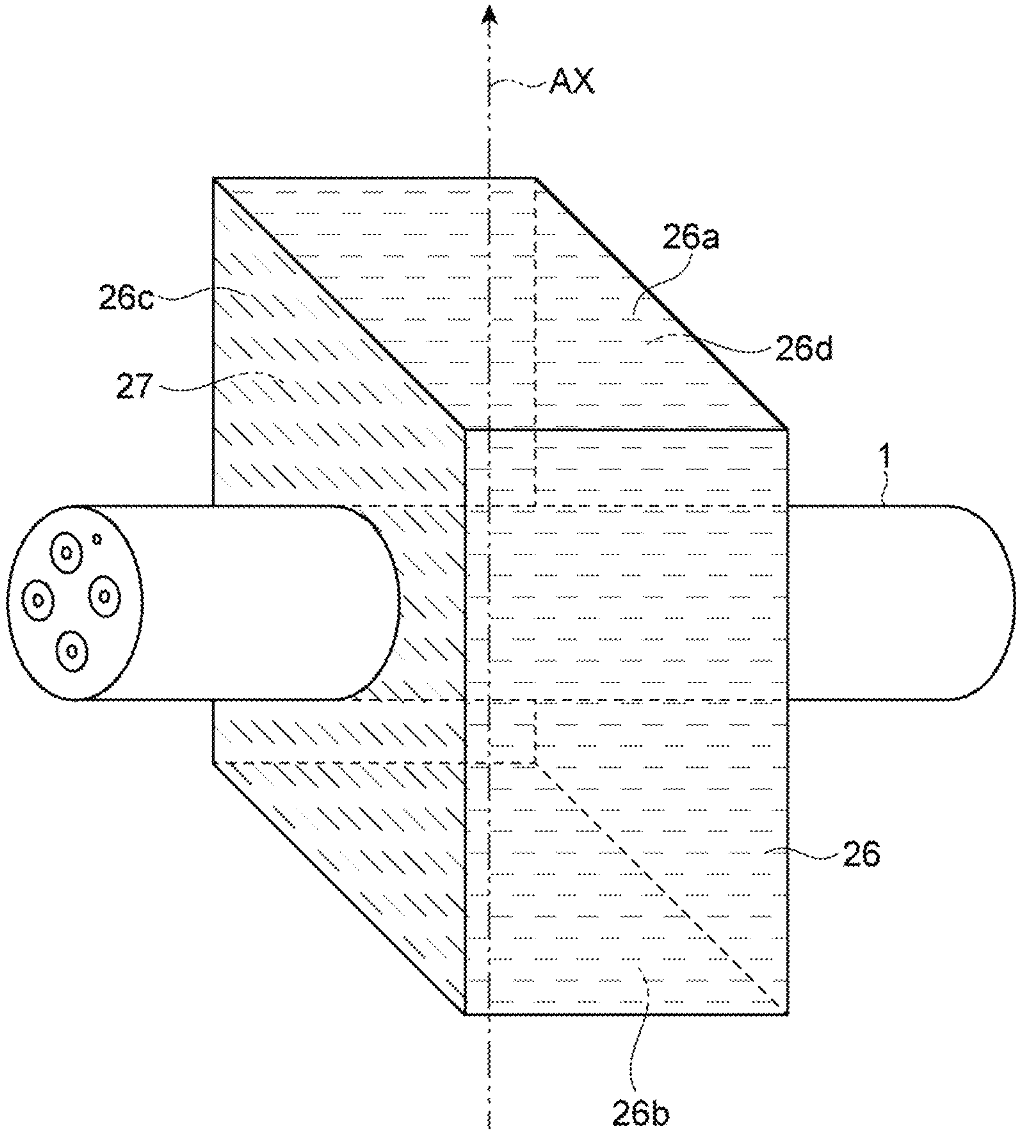
FIG. 8 is a perspective view showing the relationship between a container and an observation axis.

FIG. 7 is a configuration diagram of a measurement device for a refractive index change position according to modification. FIG. 8 is a perspective view showing the relationship between a container and an observation axis. As shown in FIGS. 7 and 8, a measurement device 20A of the refractive index change position according to modification is different from measurement device 20 in that measurement device 20A includes a container 26 that is transparent and a refractive index matching material 27 filled in container 26. Container 26 is, for example, a transparent glass cell. Container 26 may be transparent and may be made of acrylic. Container 26 is configured to be able to house at least a portion in the longitudinal direction of optical fiber preform 1. When the observation target is optical fiber preform 1, the entire observation target may be housed in container 26. In this case, the shape of container 26 can be simplified. In the embodiment, a portion in the longitudinal direction of the observation target is housed in container 26. This can save the amount of refractive index matching material 27.

Container 26 has, for example, a rectangular parallelepiped shape. Container 26 has a pair of side surfaces 26*a* and 26*b* orthogonal to observation axis AX. The pair of side surfaces 26*a* and 26*b* are opposed to each other with optical fiber preform 1 interposed therebetween. Side surface 26*a* is disposed between polarizer 23 and optical fiber preform 1, and light irradiated to optical fiber preform 1 passes through side surface 26*a*. Side surface 26*b* is disposed between optical fiber preform 1 and analyzer 24, and allows the light emitted from optical fiber preform 1 to pass through. Container 26 has a pair of side surfaces 26*c* and 26*d* intersecting (here, orthogonal to) with central axis C. The pair of side surfaces 26*c* and 26*d* are provided with circular through holes through which optical fiber preform 1 is passed.

Refractive index matching material 27 is filled in container 26, that is, in a gap between container 26 and optical fiber preform 1. Refractive index matching material 27 is a medium having a refractive index larger than the refractive index of air and equal to or smaller than the refractive index of glass. Refractive index matching material 27 may be, for example, water. By immersing optical fiber preform 1 in refractive index matching material 27, the influence of the lens effect derived from the circular shape of the outer surface of optical fiber preform 1 can be suppressed. By using refractive index matching material 27 having a refractive index equivalent to the refractive index of glass, a lateral image without distortion can be obtained. Thus, the time and effort for correcting image distortion can be omitted. Even when the refractive index of refractive index matching material 27 is lower than the refractive index of glass, the lens effect of the outer surface of optical fiber preform 1 can be reduced as compared with the case of the air atmosphere. Thus, the entire refractive index change position inside optical fiber preform 1 can be observed within the camera field of view without increasing the size of camera 22.

In the method of measuring according to modification using measurement device 20A, the preparation step S11 further includes a step of immersing at least a portion of optical fiber preform 1 in the longitudinal direction in refractive index matching material 27 (medium). In the irradiation step S13, the side surface of optical fiber preform 1 is irradiated with light L emitted from light source 21, through polarizer 23 and refractive index matching material 27. In the image acquisition step S14, the light transmitted through optical fiber preform 1 is received by camera 22 through refractive index matching material 27 and analyzer 24, and a light intensity image is acquired.

In the method of measuring related to modification using measurement device 20A, when refractive index matching material 27 having a refractive index equivalent to the refractive index of glass is used, the correction step S16 can be omitted.

In the above description, an example in which observation axis AX is actually orthogonal to central axis C and the straight line m has been described. However, in a case where observation axis AX is substantially orthogonal to central axis C and the straight line m by correction, observation axis AX may not be completely orthogonal to central axis C and the straight line m. That is, observation axis AX may be shifted from original observation axis AX orthogonal to central axis C and the straight line m. For example, observation axis AX may be on a straight line obtained by translating original observation axis AX, on a straight line obtained by rotating original observation axis AX about central axis C, or on a straight line obtained by rotating the straight line obtained by translating original observation axis AX about central axis C, in a plane orthogonal to central axis C. In these cases, the correction step S16 may include correction of the influence of the distance of the translational movement and the angle of the rotational movement.

REFERENCE SIGNS LIST

1 optical fiber preform
1*a* one end
1*b* another end
2 core portion
3 cladding portion
4 marker portion
5 central core portion
6 depressed portion
20, 20A measurement device
21 light source
22 camera
22*a* imaging element
22*b* lens
23 polarizer
24 analyzer
25 holder
26 container
26*a*, 26*b*, 26*c*, 26*d* side surface
27 refractive index matching material
AX observation axis
B direction
C central axis
b, c rotational operation
n0 refractive index of area around cladding portion
n1 refractive index of central core portion
n2 refractive index of cladding portion
nd refractive index of depressed portion
L light
L1 light ray
P point
X true passage point
D apparent point
x true distance
da apparent distance
θ0 incident angle
θ2 refracting angle
r radius

The invention claimed is:

1. A method of measuring a refractive index change position of an optical fiber preform using a measurement device including a holder configured to hold the optical fiber preform rotatably about a central axis, a light source and a camera disposed on an observation axis orthogonal to the central axis with the optical fiber preform interposed therebetween, a polarizer disposed between the light source and the optical fiber preform, and an analyzer having a transmission axis orthogonal to a transmission axis of the polarizer and disposed between the optical fiber preform and the camera, the method comprising:

rotating the optical fiber preform about the central axis so that a straight line being orthogonal to the central axis and passing through desirable two or more points of refractive index change positions to be measured is orthogonal to the observation axis;

irradiating a side surface of the optical fiber preform with light emitted from the light source, through the polarizer;

receiving light transmitted through the optical fiber preform by the camera through the analyzer and acquiring a light intensity image;

detecting the two or more points of the refractive index change positions based on the light intensity image; and moving the optical fiber preform or the observation axis in parallel to the central axis, wherein the optical fiber preform is a multi-core optical fiber preform, wherein the optical fiber preform includes a cladding portion, and a pair of core portions disposed with the central axis interposed therebetween and having a maximum center-to-center distance, wherein the two or more points of the refractive index change positions are positions on two boundaries close to an outer peripheral surface of the cladding portion among boundaries between the cladding portion and the pair of core portions existing on the straight line, and wherein the method further comprises measuring the center-to-center distance of the pair of core portions from a distance between the two boundaries detected in the detecting.

2. The method of measuring the refractive index change position of the optical fiber preform according to claim 1, the method further comprising:

immersing at least a portion in a central axis direction of the optical fiber preform in a medium having a refractive index larger than a refractive index of air and equal to or smaller than a refractive index of glass, wherein the side surface of the optical fiber preform is irradiated with the light emitted from the light source, through the polarizer and the medium, and wherein the light transmitted through the optical fiber preform is received by the camera through the medium and the analyzer and the light intensity image is acquired.

3. The method of measuring the refractive index change position of the optical fiber preform according to claim 1, wherein the optical fiber preform is a polarization-maintaining fiber preform.

4. The method of measuring the refractive index change position of the optical fiber preform according to claim 1, the method further comprising:

correcting image distortion caused by a lens effect of the side surface of the optical fiber preform for the light intensity image by an equation below, $$x = da/\left[\sqrt{(n2/n0)^2 - (da/r)^2}\sqrt{1-(da/r)^2} + (da/r)^2\right] \quad \text{[Math 1]}$$

where da is an apparent distance of the refractive index change position from the central axis, x is a true distance of the refractive index change position from the central axis, n0 is a refractive index of an area around a cladding portion, n2 is a refractive index of the cladding portion, and r is a radius of the cladding portion.

5. A device of measuring a refractive index change position of an optical fiber preform, the device comprising:

a holder configured to hold the optical fiber preform rotatably about a central axis;

a light source and a camera disposed on an observation axis orthogonal to the central axis with the optical fiber preform interposed therebetween;

a polarizer disposed between the light source and the optical fiber preform; and an analyzer having a transmission axis orthogonal to a transmission axis of the polarizer and disposed between the optical fiber preform and the camera, wherein the holder holds the optical fiber preform so that a straight line being orthogonal to the central axis and passing through desirable two or more points of refractive index change positions to be measured is orthogonal to the observation axis, wherein the light source irradiates a side surface of the optical fiber preform with light through the polarizer, wherein the camera receives light transmitted through the optical fiber preform, through the analyzer, and acquires a light intensity image in which a difference in brightness is generated at the two or more points of the refractive index change positions, and wherein the holder holds the optical fiber preform movably in a direction parallel to the central axis, or the light source, the camera, the polarizer, and the analyzer are configured to be movable in the direction parallel to the central axis, wherein the optical fiber preform is a multi-core optical fiber preform, wherein the optical fiber preform includes a cladding portion, and a pair of core portions disposed with the central axis interposed therebetween and having a maximum center-to-center distance, wherein the two or more points of the refractive index change positions are positions on two boundaries close to an outer peripheral surface of the cladding portion among boundaries between the cladding portion and the pair of core portions existing on the straight line, and wherein the device further comprises a size measuring device configured to measure the center-to-center distance of the pair of core portions from a distance between the two boundaries detected by the analyzer.

6. The device of measuring the refractive index change position of the optical fiber preform according to claim 5, the device further comprising:

a container configured to house at least a portion in a central axis direction of the optical fiber preform, the container being filled with a medium having a refractive index larger than a refractive index of air and equal to or smaller than a refractive index of glass.

7. A method of measuring a refractive index change position of an optical fiber using a measurement device including a holder configured to hold the optical fiber rotatably about a central axis, a light source and a camera disposed on an observation axis orthogonal to the central axis with the optical fiber interposed therebetween, a polarizer disposed between the light source and the optical fiber, and an analyzer having a transmission axis orthogonal to a transmission axis of the polarizer and disposed between the optical fiber and the camera, the method comprising:

rotating the optical fiber about the central axis so that a straight line being orthogonal to the central axis and passing through desirable two or more points of refractive index change positions to be measured is orthogonal to the observation axis;

irradiating a side surface of the optical fiber with light emitted from the light source, through the polarizer;

receiving light transmitted through the optical fiber by the camera through the analyzer and acquiring a light intensity image; and detecting the two or more points of the refractive index change positions based on the light intensity image, wherein the optical fiber preform is a multi-core optical fiber preform, wherein the optical fiber preform includes a cladding portion, and a pair of core portions disposed with the central axis interposed therebetween and having a maximum center-to-center distance, wherein the two or more points of the refractive index change positions are positions on two boundaries close to an outer peripheral surface of the cladding portion among boundaries between the cladding portion and the pair of core portions existing on the straight line, and wherein the method further comprises measuring the center-to-center distance of the pair of core portions from a distance between the two boundaries detected in the detecting.

8. The method of measuring the refractive index change position of the optical fiber according to claim 7, the method further comprising:

moving the optical fiber or the observation axis in parallel to the central axis.

9. The method of measuring the refractive index change position of the optical fiber according to claim 7, the method further comprising:

immersing at least a portion in a central axis direction of the optical fiber in a medium having a refractive index larger than a refractive index of air and equal to or smaller than a refractive index of glass, wherein the side surface of the optical fiber is irradiated with the light emitted from the light source, through the polarizer and the medium, and wherein the light transmitted through the optical fiber is received by the camera through the medium and the analyzer and the light intensity image is acquired.

10. The method of measuring the refractive index change position of the optical fiber according to claim 7, wherein the optical fiber is a polarization-maintaining fiber.

11. The method of measuring the refractive index change position of the optical fiber according to claim 7, the method further comprising:

correcting image distortion caused by a lens effect of the side surface of the optical fiber for the light intensity image by an equation below, $$x = da/\left[\sqrt{(n2/n0)^2 - (da/r)^2}\sqrt{1-(da/r)^2} + (da/r)^2\right] \quad \text{[Math 2]}$$

where da is an apparent distance of the refractive index change position from the central axis, x is a true distance of the refractive index change position from the central axis, n0 is a refractive index of an area around a cladding, n2 is a refractive index of the cladding, and r is a radius of the cladding.

12. A device of measuring a refractive index change position of an optical fiber, the device comprising:

a holder configured to hold the optical fiber rotatably about a central axis;

a light source and a camera disposed on an observation axis orthogonal to the central axis with the optical fiber interposed therebetween;

a polarizer disposed between the light source and the optical fiber; and an analyzer having a transmission axis orthogonal to a transmission axis of the polarizer and disposed between the optical fiber and the camera, wherein the holder holds the optical fiber so that a straight line being orthogonal to the central axis and passing through desirable two or more points of refractive index change positions to be measured is orthogonal to the observation axis, wherein the light source irradiates a side surface of the optical fiber with light through the polarizer, and wherein the camera receives light transmitted through the optical fiber through the analyzer and acquires a light intensity image in which a difference in brightness is generated at the two or more points of the refractive index change positions, wherein the optical fiber preform is a multi-core optical fiber preform, wherein the optical fiber preform includes a cladding portion, and a pair of core portions disposed with the central axis interposed therebetween and having a maximum center-to-center distance, wherein the two or more points of the refractive index change positions are positions on two boundaries close to an outer peripheral surface of the cladding portion among boundaries between the cladding portion and the pair of core portions existing on the straight line, and wherein the device further comprises a size measuring device configured to measure the center-to-center distance of the pair of core portions from a distance between the two boundaries detected by the analyzer.

13. The device of measuring the refractive index change position of the optical fiber according to claim 12, wherein the holder holds the optical fiber movably in a direction parallel to the central axis, or the light source, the camera, the polarizer, and the analyzer are configured to be movable in the direction parallel to the central axis.

* * * * *